(12) United States Patent
Michelon et al.

(10) Patent No.: US 10,961,738 B2
(45) Date of Patent: Mar. 30, 2021

(54) POOL CLEANING APPARATUS WITH OPTIMIZED CONTROL

(71) Applicant: ZODIAC POOL CARE EUROPE, Belberaud (FR)

(72) Inventors: Thierry Michelon, Toulouse (FR); Philippe Pichon, Villeneuve de Riviere (FR)

(73) Assignee: ZODIAC POOL CARE EUROPE, Bron (FR)

( * ) Notice: Subject to any disclaimer, the term of this patent is extended or adjusted under 35 U.S.C. 154(b) by 238 days.

(21) Appl. No.: 15/572,293

(22) PCT Filed: May 4, 2016

(86) PCT No.: PCT/FR2016/051060
§ 371 (c)(1),
(2) Date: Feb. 13, 2018

(87) PCT Pub. No.: WO2016/177978
PCT Pub. Date: Nov. 10, 2016

(65) Prior Publication Data
US 2018/0150963 A1    May 31, 2018

(30) Foreign Application Priority Data

May 7, 2015   (FR) ...................................... 1554125

(51) Int. Cl.
*E04H 4/16*     (2006.01)
*G06T 7/44*     (2017.01)
(52) U.S. Cl.
CPC ............. *E04H 4/1654* (2013.01); *G06T 7/44* (2017.01)

(58) Field of Classification Search
CPC ................................ E04H 4/16; E04H 4/1654
(Continued)

(56) References Cited

U.S. PATENT DOCUMENTS

| 2004/0040581 A1* | 3/2004 | Bruwer | E04H 4/1654 134/18 |
| 2014/0166045 A1* | 6/2014 | Herring | E04H 4/1654 134/1 |

(Continued)

FOREIGN PATENT DOCUMENTS

| EP | 2607573 A2 | 6/2013 |
| EP | 2835478 | * 2/2015 |
| WO | 2016137886 | 9/2016 |

OTHER PUBLICATIONS

International Patent Application No. PCT/FR2016/051060, International Search Report and Written Opinion, dated Jul. 28, 2016, 11 pages.

(Continued)

*Primary Examiner* — Mark Spisich
(74) *Attorney, Agent, or Firm* — Kilpatrick Townsend & Stockton LLP; Dean W. Russell

(57) ABSTRACT

The invention relates to a pool cleaning apparatus including: a cleaning unit (100), at least one hydraulic system for circulating a liquid between at least one liquid inlet (103) and at least one liquid outlet (104) and through a filtration device of the cleaning unit (100), a pump suitable for forcing the circulation of water between the liquid inlet (103) and the liquid outlet (104) and through the filtration device, drive and guide means for moving the cleaning unit, and means for controlling said drive and guide means. The pool cleaning apparatus includes at least one debris detection means placed in the hydraulic system of the cleaning unit (100).

5 Claims, 2 Drawing Sheets

Figure 1:
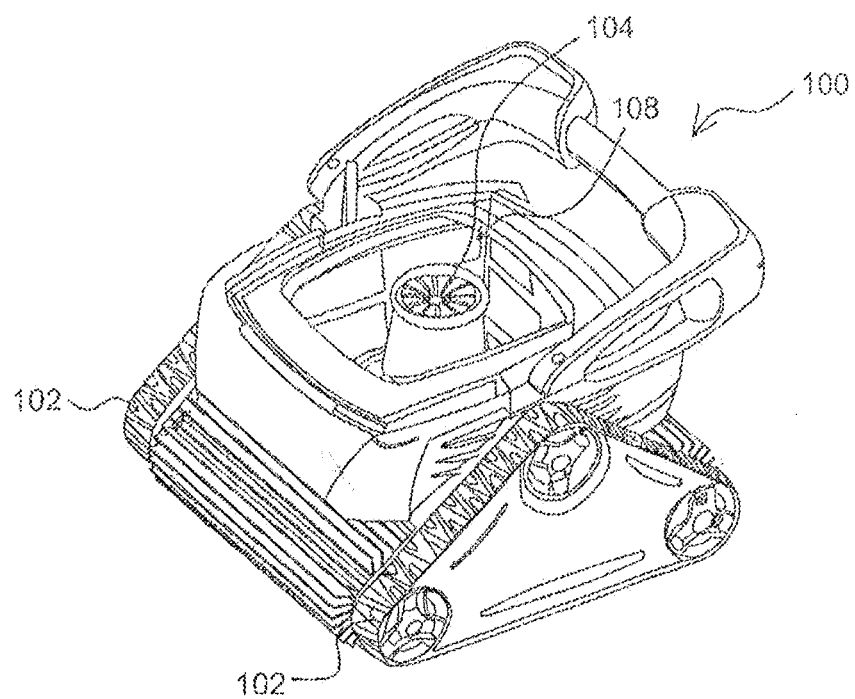

(58) Field of Classification Search
USPC .............. 15/1.7; 210/167.1, 167.15–167.17
See application file for complete search history.

(56) References Cited

U.S. PATENT DOCUMENTS

| 2015/0191927 A1* | 7/2015 | Tavor .................... E04H 4/1654 |
| | | 15/1.7 |
| 2016/0244988 A1* | 8/2016 | Barcelos ............... E04H 4/1654 |

OTHER PUBLICATIONS

Australian Application No. 2016257063, First Examination Report dated May 20, 2020, 5 pages.
French Application No. 1554125, Search Report dated Mar. 10, 2016, 8 pages.
International Application No. PCT/FR2016/051060, International Preliminary Report on Patentability dated Nov. 7, 2017, 7 pages.

* cited by examiner

POOL CLEANING APPARATUS WITH OPTIMIZED CONTROL

The present invention relates to the field of equipment for swimming pools. It relates more specifically to a swimming pool cleaning apparatus including means for optimizing control so as to improve the cleaning of the pool.

PREAMBLE AND PRIOR ART

The invention relates to an apparatus for cleaning a surface submerged in a liquid, such as a surface formed by the walls of a pool, in particular of a swimming pool. It is in particular a mobile swimming pool cleaning robot. Such a cleaning robot carries out said cleaning by travelling over the bottom and the walls of the swimming pool, brushing these walls and aspirating, into a filter, the debris that is present in the water or has been deposited on the walls. Debris is understood to be any particles that are present within the pool, such as fragments of leaves, micro-algae, etc., this debris normally being deposited on the bottom of the pool or stuck to the side walls thereof.

Most commonly, the robot is supplied with power through an electric cable that connects the robot to an external control and power supply unit.

Known in this field are, for example, the applicant's patents FR 2 925 557 and FR 2 925 551, which relate to a submerged-surface cleaning apparatus having a removable filter device. Such devices comprise a body, members for driving said body over the submerged surface, and a filtration chamber which is provided within the body and comprises a liquid inlet, a liquid outlet, a hydraulic circuit for liquid circulation between the inlet and the outlet, through a filter device. In these two patents, the filter device is removable in order to make it possible to empty the leaves and other debris without having to turn over the cleaning apparatus.

These apparatus have automatic programs for cleaning the bottom of the pool and optionally the side walls of the pool. Such a program, chosen by the user, determines cleaning of the swimming pool over a predetermined time, for example an hour and a half. The robot then travels through the swimming pool and has to be removed from the water by the user at regular intervals, when the filter is too full of particles (leaves, microparticles etc.). In recent models, the external control and power supply unit of the robot emits a signal when this filter cleaning operation has to be carried out.

It has been found that, on account, inter alia, of the geometry of the pool and of the position of the water inlets and skimmers in the pool, particles sometimes remain after a cleaning cycle. The same goes when the robot is held back by its cable and cannot travel freely over the entire surface of the swimming pool or when there is a region of the pool that has a shape conducive to significant agglomeration of debris (edge of diving well, for example).

Patent application EP 2607573, which is known from the prior art, targets the limitation of electrical consumption by a robot for cleaning a swimming pool by modulation of the aspiration power of the pump. The modulation is carried out depending on dirt identified by the processing of images captured upstream of the aspiration mouth of the robot. This apparatus requires the implementation of expensive image capturing means; in addition, the image processing quality is likely to be adversely affected by variations in luminosity.

The aim of the invention is in particular to alleviate some of these drawbacks.

The invention aims in particular to propose a swimming pool cleaning apparatus that carries out optimized cleaning of the swimming pool in terms of cleaning time or cleanness of the water and the walls of the swimming pool after an operating cycle of the robot.

SUMMARY OF THE INVENTION

According to a first aspect, the invention relates to a swimming pool cleaning apparatus comprising:
- a cleaning unit intended to be submerged in the swimming pool,
- at least one hydraulic circuit for liquid circulation between at least one liquid inlet and at least one liquid outlet, through a filtration device of the cleaning unit, able to retain the debris present in the water,
- a pump designed to force water to circulate between at least one water inlet and at least one water outlet through the filtration device,
- driving and guiding means for producing the movements of the cleaning unit,
- control means for these driving and guiding means.

The cleaning apparatus comprises at least one means for detecting debris in the hydraulic circuit of the cleaning unit.

Debris is detected in particular by the density of said debris in the water being measured.

Density measurement is understood to mean both the measurement of the quantity of debris in suspension in the water, and/or the measurement of the size of this debris.

It is this debris that the cleaning apparatus is intended to extract from the pool, by detaching this debris from the walls or the bottom and then aspirating it and retaining it in the filter of the cleaning unit (also known as the cleaning robot).

It will be understood that this debris density measurement, for example at the inlet to the filtering hydraulic circuit, is representative of the local dirtiness of the pool. In this way, the control of the cleaning unit can include commands that take into account this local dirtiness of the pool, for example, by commanding the cleaning unit to remain for a longer time in the regions in which the measured debris density is high, and for less time in the regions of the pool in which the measured debris density is low.

In one particular embodiment, the means for measuring the density of debris are disposed at the water inlet into the filtering hydraulic circuit.

In this way, the measurement is carried out upstream of the filter and is thus not skewed by the filling level thereof.

In another embodiment, the apparatus also includes means 130C (see FIG. 2) for measuring the density of debris in the water at the water outlet of the filtering hydraulic circuit. In this way, it is possible to verify that the water at the outlet of the cleaning robot has been completely purified. If this is not the case, it is then possible either to command the cleaning unit to remain for a longer time at the same location, or to inform the user of the need to empty the filter.

In one particular embodiment of the means for measuring the density of debris, the latter include an optical sensor.

Advantageously, the means for measuring the density of debris include a turbidity sensor. A turbidity sensor is understood to be an apparatus which measures the solid particles in suspension in the water by measuring the quantity of light transmitted through the water.

In one embodiment, the turbidity sensor includes a calibrated light source and an optical sensor. Advantageously, the light source and the optical sensor can be disposed facing one another.

In another embodiment, which is optionally used in conjunction with the preceding embodiment, the means for measuring the density of debris include a camera and image analysis means, making it possible to determine the size and the nature of the aspirated debris.

In yet another embodiment, which is optionally used in conjunction with one of the two preceding embodiments, the means for measuring the density of debris include means for measuring the local resistivity of the water.

In another embodiment, the measurement means include a turbidimeter, of the type used in particular in dishwashers. In this way, the equipment is inexpensive to produce and makes use of a tried and tested material.

In one particular embodiment, the swimming pool cleaning apparatus also includes means for modifying the cleaning strategy of the cleaning unit in response to the detection of debris.

In this case, in various embodiments that are optionally used in conjunction, the means for modifying the cleaning strategy comprise:
- means for controlling the movements of the cleaning unit within the pool in response to the detection of debris,
- means for modifying the power of the pump in response to the detection of debris,
- means for transmitting information to a remote user in response to the detection of debris,
- means for transmitting the results of the detection of debris in the water to an external unit for controlling the apparatus.

According to a second aspect, the invention relates to a method for controlling a swimming pool cleaning apparatus as described above, this method including the following steps in a cyclical manner:
- data relating to the density of debris in the water at the inlet to the hydraulic circuit are obtained,
- these data are compared with a predetermined threshold,
- the cleaning strategy of the cleaning unit is modified if and as long as the estimated density of debris becomes greater than a maximum value chosen beforehand.

In one embodiment, the modification in the cleaning strategy includes at least one of the following operations:
- the movements of the cleaning unit within the pool are controlled in response to the detection of debris, in order to move the cleaning unit around in the vicinity of its current location in the swimming pool.

In this way, the cleaning unit will, for example, spend more time in the regions where the density of debris is greater than a predetermined threshold, or will increase its aspiration power in this region.

In one particular embodiment, which is optionally used in conjunction with the preceding embodiment, the method includes the following steps in a cyclical manner:
- data relating to the density of debris in the water at the inlet to the filtering hydraulic circuit are obtained,
- the dirt density data are compared with at least one second predetermined threshold,
- the commands for moving the cleaning unit are modified if and as long as the estimated density of debris becomes less than a minimum value chosen beforehand, in order to move the cleaning unit away from its current location in the swimming pool.

In this way, the cleaning unit will spend less time in the regions where the density of debris is less than a predetermined threshold.

In one particular embodiment, the method also includes an initial step in which the cleaning unit travels rapidly through the swimming pool while acquiring density measurements, and at least one threshold is determined depending on the values measured during the rapid travel through the pool.

In this way, the method includes a phase of learning the normal level of debris in the pool during cleaning, and can adapt its top and bottom values depending on the average dirtiness measured. Specifically, a pool is usually much dirtier at the end of winter than during the normal season of use. The cleaning cycle can then take this situation into account.

All of the embodiments mentioned above can of course be combined in any technically feasible manner.

The invention also relates to a kit for modifying an assembly comprising a cleaning apparatus as described, and a control unit, said kit comprising an apparatus for detecting debris in the water, said apparatus being designed to be installed within the cleaning apparatus.

It optionally includes a program for controlling the apparatus, designed to be installed in the control unit and to implement a control method.

It is then possible to modify an existing piece of equipment so as to give it a control mode designed to emphasize cleaning in the dirtiest regions, and by contrast to spend less time in the cleanest regions. The installation of a sensor for measuring the density of debris in the filtering hydraulic circuit of the cleaning unit should be carried out by a professional, as should the updating of the control software within the control unit.

The invention also relates to a cleaning apparatus as described, including means for transmitting the results of the detection of debris in the water to an external unit for controlling the apparatus.

According to another aspect, the invention then relates more particularly to a cleaning set including a cleaning apparatus as described above and an external unit for controlling the apparatus, said cleaning set including means for transmitting the results of the detection of debris in the water to a control system for controlling the items of equipment of the swimming pool, and means for modifying the control thereof depending on the results of the detection of debris in the water.

PRESENTATION OF THE FIGURES

The features and advantages of the invention will be better appreciated by virtue of the following description, which describes the features of the invention by way of a nonlimiting example of application.

Figure 2:
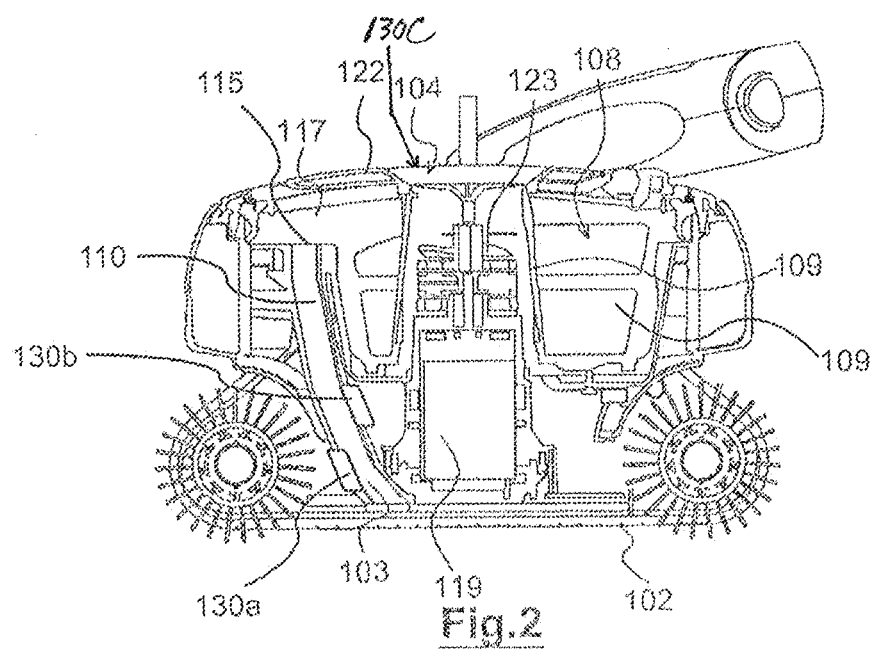
Figure 3:
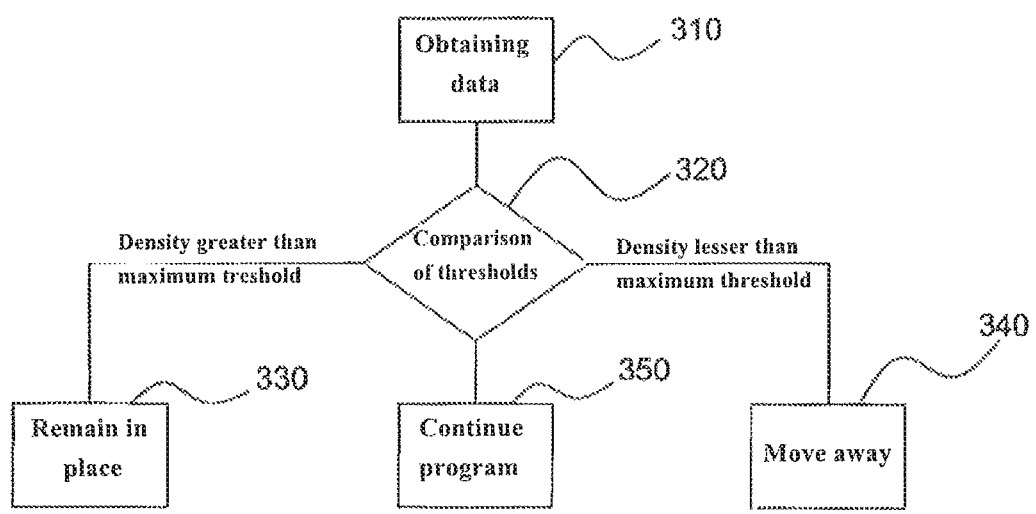

The description is based on the appended figures, in which:

FIG. 1 illustrates a perspective view of a swimming pool apparatus implementing a filtration system as described, FIG. 2 illustrates a sectional side view of the same apparatus, FIG. 3 illustrates a flowchart of the method for controlling the cleaning unit.

DETAILED DESCRIPTION OF ONE EMBODIMENT OF THE INVENTION

The invention finds its application in a swimming pool technical environment, for example a family-type swimming pool set into the ground.

A submerged-surface cleaning apparatus is shown, according to an embodiment that is given in this case by way of nonlimiting example, in FIGS. 1 and 2. It includes a cleaning unit, referred to as swimming pool cleaning robot below, and a power supply and control unit for said swimming pool cleaning robot, said unit being situated outside the pool.

The swimming pool cleaning robot 100 comprises a body and a driving and guiding device comprising members 102 for driving and guiding the body over a submerged surface. In the present nonlimiting example, these driving and guiding means 102 are formed by wheels or caterpillar tracks disposed laterally on the body (see FIG. 1).

The swimming pool cleaning robot 100 also comprises a motor that drives said driving and guiding members 102, said motor being supplied with power via a cable. In one variant, the wheels or caterpillar tracks 102 are controllable independently of one another so as to be able to freely orient the cleaning robot on the walls of the swimming pool, in forward-running or reverse-running mode.

The swimming pool cleaning robot 100 has a hydraulic circuit including at least one liquid inlet 103 and a liquid outlet 104. The liquid inlet 103 is, in the present nonlimiting example, situated at the base of the body (in other words under the latter, when the swimming pool cleaning robot is placed in its normal operating position at the bottom of the swimming pool), that is to say immediately next to a submerged surface over which the apparatus 100 moves in order to be able to aspirate the debris accumulated on said submerged surface. The liquid outlet 104 is situated on the top of the swimming pool cleaning robot 100. In the present exemplary embodiment, the liquid outlet 104 is made in a direction substantially perpendicular to the guiding plane, that is to say vertically if the cleaning apparatus is resting on the bottom of the swimming pool.

The hydraulic circuit connects the liquid inlet 103 to the liquid outlet 104. The hydraulic circuit is designed to be able to allow the liquid to circulate from the liquid inlet 103 towards the liquid outlet 104. To this end, the apparatus comprises a pump comprising a motor 119 and an axial flow impeller 123 (see FIG. 2), said motor 119 driving the axial flow impeller 123 in rotation, said axial flow impeller 123 being disposed in the hydraulic circuit.

In the present exemplary embodiment, the axial flow impeller 123 is disposed downstream of the filter—that is to say just upstream of the liquid outlet 104.

The electric motor 119 drives the axial flow impeller 123 of the circulation pump and, optionally, the driving and guiding device.

The swimming pool cleaning robot 100 comprises a filtration chamber 108 that is interposed, in the hydraulic circuit, between the liquid inlet 103 and the liquid outlet 104.

In the present exemplary embodiment, illustrated in particular in FIG. 1, the filtration chamber 108 comprises a filtration basket 117 and a cover 122 forming the upper wall of the filtration chamber 108.

The filtration basket 117 forms the bottom and the external and internal peripheral walls of the filtration chamber 108.

The bottom and the external and internal peripheral walls of the filtration chamber 108 comprise at least one filtering wall 109, the liquid contained in the filtration chamber 108 being evacuated towards the liquid outlet 104 through said central filtering wall 109.

A pipe 110, situated between the liquid inlet 103 into the hydraulic circuit and the liquid inlet 115 into the filtration chamber 108, carries the water loaded with debris into the upper part of the filtration basket 117.

In other exemplary embodiments, the pipe can be very short or even non-existent. In this case, the liquid inlet 103 of the hydraulic circuit is coincident with the liquid inlet 115 of the filtration chamber 108.

The swimming pool cleaning robot 100 is supplied with power and with operating commands by means of a flexible cable. In the present example, this flexible cable is attached to the body of the swimming pool cleaning robot 100 in its upper part. This flexible cable is connected, at its other end, to the power supply and control unit (not illustrated in FIG. 1) disposed outside the pool, this power supply and control unit being itself connected to the electrical mains supply.

The cleaning robot may also emit data to and receive data from the power supply and control unit. In the present example, the cleaning robot includes in particular means for detecting whether the fouling of the filter has exceeded a predetermined threshold, and for transmitting the data to the power supply and control unit in order to emit an alert to a user. In one exemplary embodiment, the swimming pool cleaning robot 100 includes a processor that is able to execute a predetermined algorithm that generates commands for moving the robot and for operating the filtration circuit.

This power supply and control unit also includes a control interface so that a user of the cleaning robot can choose, for example, a type of cleaning cycle, or can interrupt the operation of the robot.

In a variant embodiment, the power supply and control unit includes a processor that is able to execute a predetermined algorithm that generates commands for moving the swimming pool cleaning robot 100 and for operating the filtration circuit.

In this case, the swimming pool cleaning robot 100 includes at least one device 130*a*, 130*b* for detecting debris in the water (known as turbidimeter in the rest of the description). In the present exemplary embodiment, a turbidimeter 130 is disposed inside the hydraulic circuit, downstream of the water inlet 103 in position 130*a* or in the conduit 110 at position 130*b*.

In other embodiments, a plurality of turbidimeters are present, for example in the two locations 130*a*, 130*b* described above.

It is for example an optical sensor, associated with a computing means that detects variations in the opacity of the water. Such a device is then optionally associated with a calibrated light source. It is also possible, alternatively, to use a device based on resistivity measurements, or any other device known to a person skilled in the art that is designed to provide a measurement of the density of debris floating in the water at the inlet of the hydraulic circuit.

The turbidimeter can also be installed on the external surface of the robot body, or within a second water pipe that does not include a filter.

The turbidimeter sends measurement data continuously or at regular intervals (for example every few seconds) to the means for controlling the pumping, driving and guiding means.

Mode of Operation

As can be seen in FIG. 3, which illustrates, in a nonlimiting manner, a flowchart of a method for controlling the cleaning apparatus as described above, such a method includes for example the following steps:

310. Data relating to the density of debris in the water at the inlet to the hydraulic circuit are obtained, 320. These data are compared with at least one predetermined threshold, 330. The commands for moving the cleaning unit are modified if and as long as the estimated density of debris is greater than a maximum value chosen beforehand, in order to move the cleaning unit around in the vicinity of its current location in the swimming pool, 340. The commands for moving the cleaning unit are modified if and as long as the estimated density of debris is less than a minimum value chosen beforehand, in order to move the cleaning unit away from its current location in the swimming pool, 350. The previous control mode is maintained if and as long as the estimated density of debris is between the minimum and maximum values.

The commanded movements of the cleaning unit about its current position can consist of circles or of a spiral about this position, or even of movements of a fractal nature.

Similarly, the movement away can consist of a straight-line movement for a predetermined time, for example a few seconds, this corresponding to a distance of a few metres, typically six seconds corresponding to a movement away of around one metre.

In the absence of data received from the turbidimeter or of data departing from a predetermined range of values, the control method no longer takes into account the turbidimeter data, and returns to the usual control mode for a cleaning unit, such a control method being known to a person skilled in the art and departing as such from the scope of the present invention.

Variants

In another variant, the turbidimeter is installed a posteriori on a pre-existing cleaning unit, in the form of an upgrade kit. In this variant, the logic operation executed by the power supply and control unit is also modified to take into account the control modifications to be commanded according to the data received from the turbidimeter.

If a detection of particles at the outlet of the water circuit is observed, it is possible to send a message to the control unit, which can inform the user of an adaptation to the operation of the water filtration and treatment system.

If the control box of the robot can exchange data with the water filtration and treatment control boxes, the adjustment can be made automatically.

The invention claimed is:

1. A swimming pool cleaning apparatus comprising:
   a. a body having an inlet and an outlet;
   b. a filtration device positioned in a hydraulic circuit between the inlet and the outlet;
   c. a pump configured to cause liquid to move in the hydraulic circuit;
   d. means for driving and guiding the body;
   e. means for measuring density of debris in the liquid at the outlet of the hydraulic circuit; and
   f. means for measuring density of debris in the liquid between the inlet and the filtration device.

2. A swimming pool cleaning apparatus according to claim 1 in which the means for measuring density of debris in the liquid at the outlet comprises a first turbidity sensor and the means for measuring density of debris in the liquid between the inlet and the filtration device comprises a second turbidity sensor.

3. A swimming pool cleaning apparatus according to claim 2 further comprising a conduit positioned between the inlet and the filtration device and in which the second turbidity sensor is disposed.

4. A swimming pool cleaning apparatus according to claim 1 further comprising a processor configured to generate commands to actuate the means for driving and guiding the body.

5. A swimming pool cleaning apparatus according to claim 1 in which the means for driving and guiding the body comprises wheels or caterpillar tracks.

* * * * *